(12) United States Patent
Nakayama

(10) Patent No.: US 10,189,500 B2
(45) Date of Patent: Jan. 29, 2019

(54) PARKING ASSISTANCE APPARATUS

(71) Applicant: AISIN SEIKI KABUSHIKI KAISHA, Kariya-shi, Aichi-ken (JP)

(72) Inventor: Yasuhito Nakayama, Anjo (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 15/877,525

(22) Filed: Jan. 23, 2018

(65) Prior Publication Data

US 2018/0208244 A1  Jul. 26, 2018

(30) Foreign Application Priority Data

Jan. 25, 2017  (JP) ................ 2017-011454

(51) Int. Cl.
```
B62D 15/02    (2006.01)
G08G 1/14     (2006.01)
G06K 9/00     (2006.01)
G08G 1/16     (2006.01)
```

(52) U.S. Cl.
CPC ....... *B62D 15/027* (2013.01); *B62D 15/0285* (2013.01); *G06K 9/00362* (2013.01); *G06K 9/00812* (2013.01); *G06K 9/00838* (2013.01); *G08G 1/143* (2013.01); *G08G 1/168* (2013.01)

(58) Field of Classification Search
CPC .. C07K 14/515; C07K 14/705; C12Q 1/6809; C12Q 1/6883; C12Q 2600/136; C12Q 2600/158; G01N 2333/515; G01N 2500/04; G01N 33/74; Y10T 436/145555
See application file for complete search history.

(56) References Cited

U.S. PATENT DOCUMENTS

| | | | |
|---|---|---|---|
| 2007/0146165 A1* | 6/2007 | Tanaka | B62D 15/0285 340/932.2 |
| 2013/0085640 A1* | 4/2013 | Hong | B62D 15/0285 701/41 |
| 2016/0355178 A1* | 12/2016 | Shiraishi | B60W 30/06 |
| 2017/0096168 A1* | 4/2017 | Yang | G08G 1/143 |
| 2017/0108865 A1* | 4/2017 | Rohde | B60W 40/08 |

FOREIGN PATENT DOCUMENTS

JP    2012-081838 A    4/2012

* cited by examiner

*Primary Examiner* — Ojiako K Nwugo
(74) *Attorney, Agent, or Firm* — Sughrue Mion, PLLC

(57) ABSTRACT

A parking assistance apparatus includes: an occupant information processing unit configured to process information on an occupant of a vehicle to generate occupant information; a peripheral information processing unit configured to process information on a periphery of the vehicle to generate peripheral information including information on an object in the periphery of the vehicle; and a parking setting unit configured to detect a parkable area which is an area in which the vehicle is parkable based on the peripheral information, and set a parking target position that is a target of parking of the vehicle in the parkable area based on the occupant information.

14 Claims, 8 Drawing Sheets

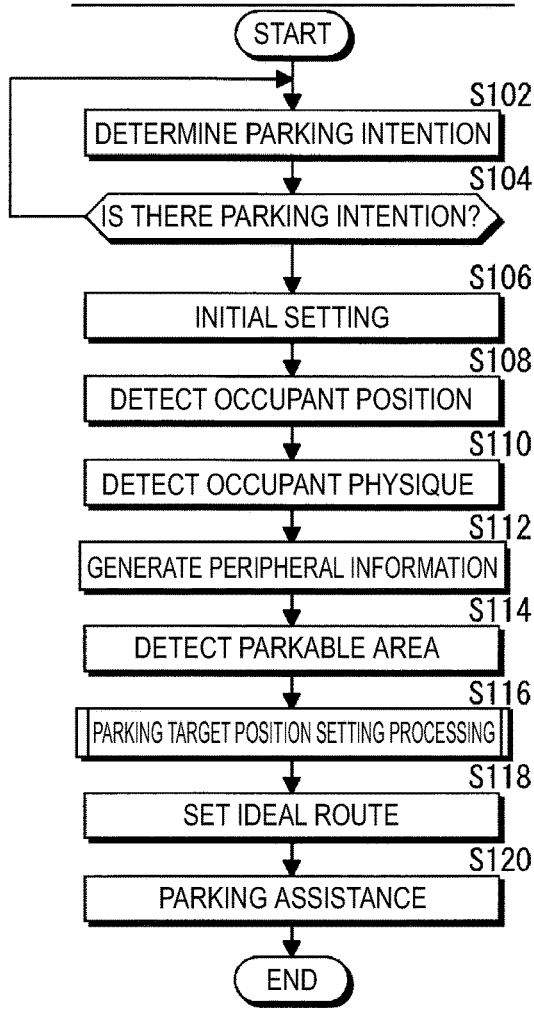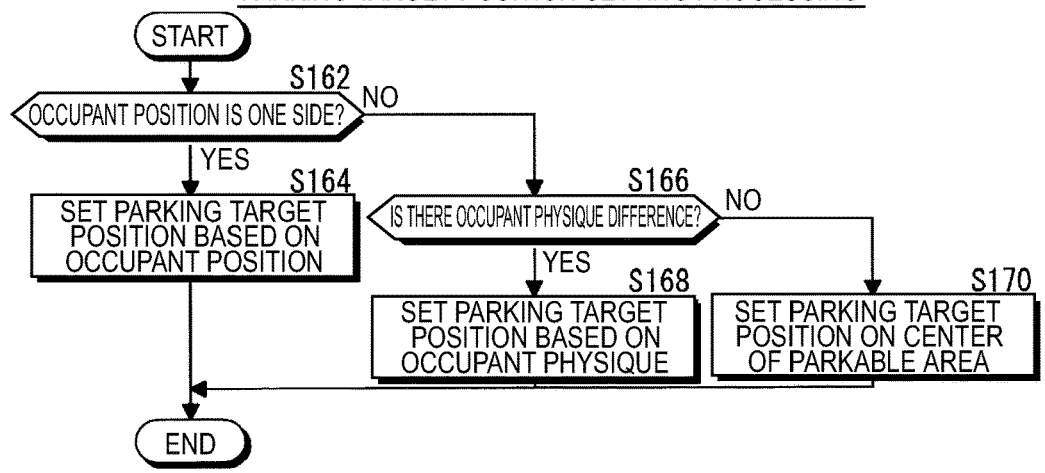

PARKING TARGET POSITION SETTING PROCESSING

PARKING ASSISTANCE APPARATUS

CROSS REFERENCE TO RELATED APPLICATIONS

This application is based on and claims priority under 35 U.S.C. § 119 to Japanese Patent Application 2017-011454, filed on Jan. 25, 2017, the entire contents of which are incorporated herein by reference.

TECHNICAL FIELD

This disclosure relates to a parking assistance apparatus.

BACKGROUND DISCUSSION

There has been known a parking assistance apparatus, which assists parking of a moving body such as an automobile. For example, the parking assistance apparatus detects an obstacle around a parkable area. Thereafter, the parking assistance apparatus assists parking by setting an appropriate position within the parkable area as a parking target position based on the obstacle. See, for example, JP 2012-081838 A (Reference 1).

However, the parking assistance apparatus has a problem in that it may not set the parking target position at an appropriate position for an occupant since the parking assistance apparatus sets the parking target position in consideration of only a peripheral situation such as the obstacle.

Thus, a need exists for a parking assistance apparatus which is not susceptible to the drawback mentioned above.

SUMMARY

A parking assistance apparatus according to an aspect of this disclosure includes an occupant information processing unit configured to process information on an occupant of a vehicle to generate occupant information, a peripheral information processing unit configured to process information on a periphery of the vehicle to generate peripheral information including information on an object in the periphery of the vehicle, and a parking setting unit configured to detect a parkable area which is an area in which the vehicle is parkable based on the peripheral information, and set a parking target position that is a target of parking of the vehicle in the parkable area based on the occupant information.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a flowchart of a parking assistance processing according to the first embodiment;

FIG. 3 is a flowchart of a parking target position setting processing according to the first embodiment;

DETAILED DESCRIPTION

Figure 1:
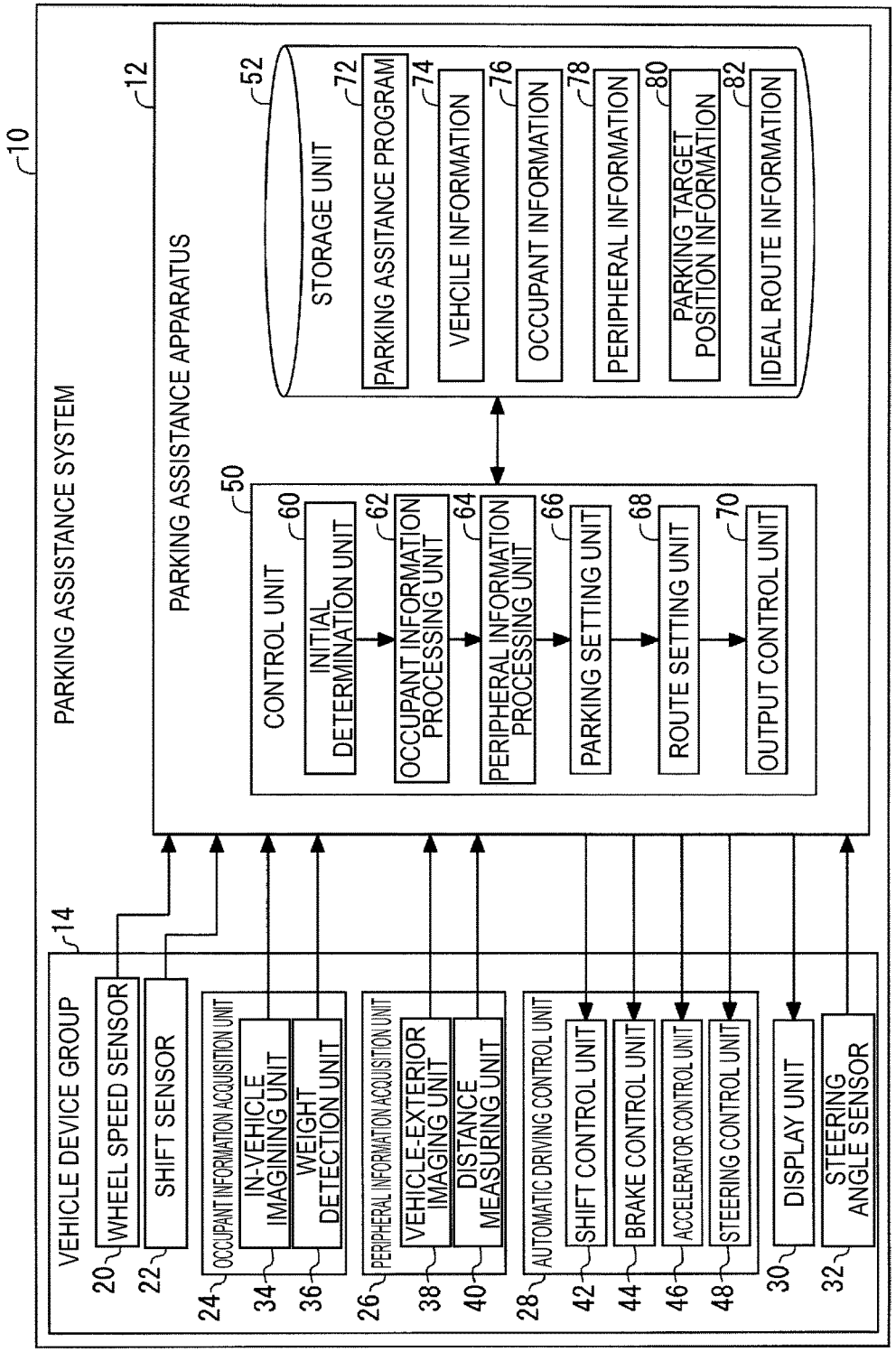
FIG. 1 is a view illustrating an overall configuration of a parking assistance system having a parking assistance apparatus according to a first embodiment.

Hereinafter, the same reference numerals will be given to the same constituent elements of following exemplary embodiments and the like, and a repeated description thereof will be appropriately omitted.

<First Embodiment>

FIG. 1 is a view illustrating an overall configuration of a parking assistance system 10 having a parking assistance apparatus 12 according to a first embodiment. The parking assistance system 10 is a system that is mounted in a vehicle such as an automobile having four or more wheels, and assists parking of the vehicle (e.g., parallel parking or row parking). The vehicle may be, for example, an automobile (internal combustion engine automobile) using an internal combustion engine (an engine (not illustrated)) as a drive source, or an automobile (an electric automobile, a fuel cell automobile, etc.) using an electric motor (motor (not illustrated)) as a drive source, or may be an automobile (hybrid automobile) using both of them as a drive source. In addition, the vehicle may be equipped with various transmission devices, and may be equipped with various devices (systems, elements, etc.) necessary for driving the internal combustion engine or the electric motor. In addition, the type, the number, the layout, and the like of devices associated with the driving of wheels in the vehicle may be set in various ways. As illustrated in FIG. 1, the parking assistance system 10 includes a vehicle device group 14 and the parking assistance apparatus 12.

The vehicle device group 14 detects the state of the inside and the periphery of the vehicle, and controls each part based on an instruction from the parking assistance apparatus 12. The vehicle device group 14 includes a wheel speed sensor 20, a shift sensor 22, an occupant information acquisition unit 24, a peripheral information acquisition unit 26, an automatic driving control unit 28, a display unit 30, and a steering angle sensor 32.

The wheel speed sensor 20 is a sensor that detects the amount of rotation of the wheel of the vehicle or the number of revolutions per unit time. The wheel speed sensor 20 includes, for example, a Hall element or the like. The wheel speed sensor 20 outputs the detected amount of rotation or the detected number of revolutions, as a detected value, to the parking assistance apparatus 12.

The shift sensor 22 includes a displacement sensor or the like that detects the position of a movable portion of a shift, which shifts the vehicle or switches between forward and reverse. The shift sensor 22 outputs the detected shift position to the parking assistance apparatus 12.

The occupant information acquisition unit 24 acquires information on an occupant who rides in the vehicle, and outputs the information to the parking assistance apparatus 12. The occupant information acquisition unit 24 includes an in-vehicle imaging unit 34 and a weight detection unit 36.

The in-vehicle imaging unit 34 includes one or a plurality of cameras such as digital cameras provided on a dashboard or the like. The in-vehicle imaging unit 34 generates an image (hereinafter, "in-vehicle image") obtained by imaging the situation inside the vehicle including the occupant in the vehicle. The in-vehicle imaging unit 34 outputs data of the in-vehicle image including a generated image of the occupant, as information on the occupant, to the parking assistance apparatus 12.

The weight detection unit 36 includes, for example, a plurality of weight sensors provided on each seat of the vehicle. The weight detection unit 36 detects the weight on the seat. The weight detection unit 36 outputs a value of the weight on the seat, as information on the occupant, to the parking assistance apparatus 12.

The peripheral information acquisition unit 26 acquires information on the periphery of the vehicle, and outputs the information to the parking assistance apparatus 12. The peripheral information acquisition unit 26 includes a vehicle-exterior imaging unit 38 and a distance measuring unit 40.

The vehicle-exterior imaging unit 38 includes one or a plurality of cameras such as digital cameras provided on the front portion, the side portion, the rear portion, and the like of the vehicle. The vehicle-exterior imaging unit 38 generates an image of the periphery (hereinafter, "peripheral image") by imaging the situation of the periphery of the vehicle. The vehicle-exterior imaging unit 38 outputs the generated peripheral image, as information on the periphery, to the parking assistance apparatus 12.

The distance measuring unit 40 includes one or a plurality of distance measuring sensors such as laser distance measuring sensors provided on the front portion, the side portion, the rear portion, and the like of the vehicle. The distance measuring unit 40 generates distance measurement information by measuring the distance to an object in the periphery of the vehicle. The distance measuring unit 40 outputs the generated distance measurement information, as information on the periphery, to the parking assistance apparatus 12.

The automatic driving control unit 28 controls each component of the vehicle based on a control instruction from the parking assistance apparatus 12 during automatic driving or the like. The automatic driving control unit 28 includes a shift control unit 42, a brake control unit 44, an accelerator control unit 46, and a steering control unit 48. Each of the shift control unit 42, the brake control unit 44, the accelerator control unit 46, and the steering control unit 48 may be, for example, a computer such as an electronic control unit (ECU).

The shift control unit 42 acquires a shift control instruction from the parking assistance apparatus 12. The shift control unit 42 controls shifting based on the corresponding shift control instruction during automatic driving or the like.

The brake control unit 44 acquires a brake control instruction from the parking assistance apparatus 12. The brake control unit 44 controls a brake based on the corresponding brake control instruction during automatic driving or the like.

The accelerator control unit 46 acquires an accelerator control instruction from the parking assistance apparatus 12. The accelerator control unit 46 controls an accelerator based on the corresponding accelerator control instruction during automatic driving or the like.

The steering control unit 48 acquires a steering control instruction from the parking assistance apparatus 12. The steering control unit 48 controls a steering wheel based on the corresponding steering control instruction during automatic driving or the like.

The display unit 30 is, for example, a display device such as a liquid crystal display device capable of outputting an image and sound. The display unit 30 displays an image and outputs sound based on image information and sound information acquired from the parking assistance apparatus 12. The display unit 30 may include an input/output device such as a touch panel and an operation button.

The steering angle sensor 32 is a sensor that detects the amount of steering of the steering wheel by a rotation angle or the like. The steering angle sensor 32 includes, for example, a Hall element or the like. The steering angle sensor 32 outputs the detected amount of steering to the parking assistance apparatus 12 during automatic driving or the like.

The parking assistance apparatus 12 assists parking of the vehicle by setting a parking target position, which is a target position at which the vehicle is parked, based on occupant information 76 or the like. An example of the parking assistance apparatus 12 is a computer such as an electronic control unit (ECU). The parking assistance apparatus 12 includes a control unit 50 and a storage unit 52.

The control unit 50 is, for example, a hardware processor such as a central processing unit (CPU) or a graphics processing unit (GPU). The control unit 50 may include a plurality of hardware processors. The control unit 50 includes an initial determination unit 60, an occupant information processing unit 62, a peripheral information processing unit 64, a parking setting unit 66, a route setting unit 68, and an output control unit 70. For example, by reading a parking assistance program 72, the control unit 50 has functions of the initial determination unit 60, the occupant information processing unit 62, the peripheral information processing unit 64, the parking setting unit 66, the route setting unit 68, and the output control unit 70. Some or all of the initial determination unit 60, the occupant information processing unit 62, the peripheral information processing unit 64, the parking setting unit 66, the route setting unit 68, and the output control unit 70 may be configured by hardware such as a circuit including an application specific integrated circuit (ASIC).

The initial determination unit 60 determines the presence or absence of a parking intention of the occupant in a parking assistance processing. For example, the initial determination unit 60 determines the presence or absence of the parking intention based on the detected value from the wheel speed sensor 20, information on the shift position from the shift sensor 22, and the like. In addition, the initial determination unit 60 may determine the presence or absence of the parking intention based on vehicle speed information acquired from an external system. When it is determined that there is the parking intention, the initial determination unit 60 executes initial setting related to vehicle information 74 or the like that is necessary for parking assistance. After determining the parking intention or after the initial setting, the initial determination unit 60 outputs an occupant information processing instruction to the occupant information processing unit 62.

When acquiring the occupant information processing instruction, the occupant information processing unit 62 generates occupant information 76, which is information of the occupant by processing the information on the occupant acquired from the occupant information acquisition unit 24. An example of the information on the occupant is information on the inside of the vehicle. For example, the occupant information processing unit 62 may detect a position of the occupant (hereinafter, "occupant position") in the vehicle by processing the in-vehicle image acquired from the in-vehicle imaging unit 34, as information on the occupant, and may generate the occupant information 76 including the occupant position. In a case where there are a plurality of occupants, the occupant information processing unit 62 may generate the occupant information 76 including information on the physiques of the plurality of occupants by processing the information on the occupant acquired from the occupant information acquisition unit 24. For example, the occupant information processing unit 62 may detect the weight of the occupant as physique information by processing the weight value on the seat acquired from the weight detection unit 36 as information on the occupant, and may generate the occupant information 76 including information on the weight of the corresponding occupant. In addition, the occupant information processing unit 62 may detect the width of the body of the occupant such as the shoulder width as physique information by processing the in-vehicle image acquired from the in-vehicle imaging unit 34 as information on the occupant, and may generate the occupant information 76 including information on the width of the corresponding occupant. The occupant information processing unit 62 stores the generated occupant information 76 in the storage unit 52. When generating the occupant information 76, the occupant information processing unit 62 outputs a peripheral information processing instruction.

When acquiring the peripheral information processing instruction, the peripheral information processing unit 64 generates peripheral information 78 including information on an object in the periphery of the vehicle by processing information on the periphery acquired from the peripheral information acquisition unit 26. For example, the peripheral information processing unit 64 generates the peripheral information 78, which includes information on the shape of the object in the periphery of the vehicle, the distance to the object, and the like, based on the peripheral image acquired from the vehicle-exterior imaging unit 38, the distance measurement information acquired from the distance measuring unit 40, and the like, and stores the generated peripheral information 78 in the storage unit 52. When generating the peripheral information 78, the peripheral information processing unit 64 outputs a parking setting instruction.

When acquiring the parking setting instruction, the parking setting unit 66 detects a parkable area, which is an area at which the vehicle is parkable, in the periphery of the vehicle based on the peripheral information 78. The parking setting unit 66 sets a parking target position, which is a target of parking of the vehicle, in the corresponding parkable area, based on the occupant information 76. For example, the parking setting unit 66 may set the parking target position in the parkable area based on the occupant position included in the occupant information 76. In addition, for example, when there are a plurality of occupants, the parking setting unit 66 may set the parking target position in the parkable area based on the physiques of the plurality of occupants (e.g., a size relationship between the physiques or a difference between the physiques). The parking setting unit 66 stores parking target position information 80, which is information on the parking target position, in the storage unit 52. The parking setting unit 66 outputs a route setting instruction to the route setting unit 68.

When acquiring the route setting instruction, the route setting unit 68 sets an ideal route by a known method based on the peripheral information 78 and the parking target position information 80. The ideal route is an ideal route from an own vehicle position, which is the position of the vehicle, to the parking target position having no interference from a peripheral object. The route setting unit 68 stores ideal route information 82, which is information on the ideal route, in the storage unit 52. When setting the ideal route, the route setting unit 68 outputs an output control instruction to the output control unit 70.

When acquiring the output control instruction, the output control unit 70 assists parking based on the ideal route set by the route setting unit 68 and the parking target position. For example, the output control unit 70 may assist parking by superimposing an image, related to the ideal route and the parking target position, on a peripheral image, imaged by the vehicle-exterior imaging unit 38, to display the superimposed image on the display unit 30, and also providing audio guidance. In addition, the output control unit 70 may control each of the control units 42, 44, 46 and 48 of the automatic driving control unit 28 based on the ideal route and the parking target position, and may automatically drive the vehicle to the parking target position.

The storage unit 52 is a storage device including read only memory (ROM), random access memory (RAM), hard disk drive (HDD), solid state drive (SSD), or the like. The storage unit 52 stores a program executed by the control unit 50, information required by the control unit 50 for the execution of the program, and information generated by the execution of the program by the control unit 50. For example, the storage unit 52 stores the parking assistance program 72 executed by the control unit 50. The storage unit 52 stores the vehicle information 74 required for the execution of the parking assistance program 72 by the control unit 50. The storage unit 52 stores the occupant information 76, the peripheral information 78, the parking target position information 80, and the ideal route information 82 generated by the execution of the parking assistance program 72 by the control unit 50. In addition, the occupant information 76 may include information on a person who frequently gets on the vehicle, for example, an owner and family of the vehicle or the like in advance. The peripheral information 78 may include information on frequently parked places, for example, parking lots of the owner's house or a neighboring shopping center in advance.

FIG. 2 is a flowchart of a parking assistance processing according to the first embodiment.

As illustrated in FIG. 2, in the parking assistance processing, the initial determination unit 60 determines whether or not there is a parking intention (S102). For example, the initial determination unit 60 calculates a vehicle speed from a detected value of the wheel speed sensor 20. The initial determination unit 60 determines the presence or absence of a parking intention based on the vehicle speed. Specifically, when the vehicle speed is equal to or greater than a parking threshold value, which is set and stored in advance in the storage unit 52, the initial determination unit 60 determines that there is no parking intention. When the vehicle speed is less than the parking threshold value, the initial determination unit 60 determines that there is a parking intention. When the initial determination unit 60 determines that there is no parking intention (S104: No), the initial determination unit 60 repeats the processings after step S102.

When the initial determination unit 60 determines that there is a parking intention (S104: Yes), initial setting is executed (S106). For example, the initial determination unit 60 executes initial setting such as an operation of acquiring the vehicle information 74 such as the width and length of the vehicle from a nonvolatile memory such as a ROM of the storage unit 52 and storing the vehicle information in a volatile memory such as a RAM. When the initial setting is terminated, the initial determination unit 60 outputs an occupant information processing instruction to the occupant information processing unit 62.

When acquiring the occupant information processing instruction, the occupant information processing unit 62 detects an occupant position based on an in-vehicle image acquired from the in-vehicle imaging unit 34 of the occupant information acquisition unit 24 as information on the occupant (S108). For example, the occupant information processing unit 62 detects which of the front, rear, left, and right positions of the vehicle the occupant is present at, based on the in-vehicle image, and stores information on the detected occupant position, as the occupant information 76, in the storage unit 52.

Next, the occupant information processing unit 62 detects the physique of the occupant based on the information on the occupant acquired from the occupant information acquisition unit 24 as information on the occupant (S110). For example, the occupant information processing unit 62 may detect the physique of each occupant (e.g., the weight of the occupant) based on the weight value acquired from the weight detection unit 36 as information on the occupant. In addition, the occupant information processing unit 62 may detect the physique of each occupant (e.g., the width of the occupant such as the shoulder width) based on the in-vehicle image acquired from the in-vehicle imaging unit 34 as information on the occupant. The occupant information processing unit 62 stores the information on the physique of the occupant, as the occupant information 76, in the storage unit 52, in association with the position of each occupant. When terminating the generation of the occupant information 76 including the occupant position and the physique of the occupant, the occupant information processing unit 62 outputs a peripheral information processing instruction to the peripheral information processing unit 64.

When acquiring the peripheral information processing instruction, the peripheral information processing unit 64 generates the peripheral information 78 by processing information on the periphery of the vehicle (S112). For example, the peripheral information processing unit 64 acquires an image of the periphery of the vehicle from the vehicle-exterior imaging unit 38 and distance measurement information indicating the distance from the distance measuring unit 40 to a peripheral object as information on the periphery. The peripheral object includes, for example, a parking frame indicated by a white line, another vehicle near the parking frame, a wall, a pole, or the like. The peripheral information processing unit 64 detects the position, shape, and the like of the peripheral object from the information on the periphery. The peripheral information processing unit 64 generates the peripheral information 78 including the corresponding detected information, and stores the peripheral information in the storage unit 52. When terminating the generation of the peripheral information 78, the peripheral information processing unit 64 outputs a parking setting instruction to the parking setting unit 66.

When acquiring the parking setting instruction, the parking setting unit 66 detects a parkable area, which is an area at which the vehicle is parkable, based on the peripheral information 78 including information on the peripheral object (S114). For example, the parking setting unit 66 detects an empty area near the vehicle based on the peripheral information 78. The parking setting unit 66 determines whether or not the vehicle is parkable in the corresponding empty area based on the vehicle information 74. When it is determined that the vehicle is parkable in the empty area, the parking setting unit 66 sets the corresponding detected empty area as a parkable position.

The parking setting unit 66 sets a parking target position, which is a target position for parking the vehicle, in the parkable area by executing a parking target position setting processing (S116).

FIG. 3 is a flowchart of a parking target position setting processing according to the first embodiment.

As illustrated in FIG. 3, in the parking target position setting processing of the first embodiment, the parking setting unit 66 determines whether or not a position of the occupant is one of the left and right sides of the vehicle (S162). Specifically, the parking setting unit 66 acquires information on the occupant position from the occupant information 76 in the storage unit 52. The parking setting unit 66 determines whether or not the occupant position is one of the left and right sides inside the vehicle. For example, when the occupant position is only the right side or the left side inside the vehicle, the parking setting unit 66 determines that the occupant position is on one side. When the occupant position is both the left and right sides inside the vehicle, the parking setting unit 66 determines that the occupant position is not one side.

When it is determined that the occupant position is one side (S162: Yes), the parking setting unit 66 sets a parking target position in the parkable area based on the occupant position, and stores the parking target position information 80 in the storage unit 52 (S164). Specifically, the parking setting unit 66 sets the parking target position in the parkable area such that the side of the occupant position of the vehicle is located away from the boundary of the parkable area and the opposite side to the occupant position of the vehicle is located close to the boundary of the parkable area. In other words, the parking setting unit 66 sets the parking target position in the parkable area such that the own vehicle position of the vehicle in the transverse direction (e.g., the center of the vehicle in the transverse direction) is located closer to the boundary of the parkable area, which is the opposite side to the occupant position of the vehicle, from the center of the parkable area.

Figure 4:
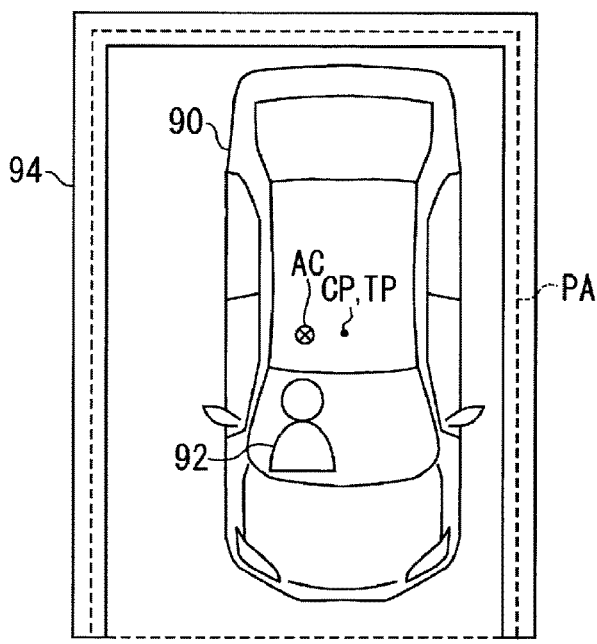
FIG. 4 is a plan view illustrating an example of a parking target position set by the parking target position setting processing of FIG. 3.

FIG. 4 is a plan view illustrating an example of a parking target position TP set by the parking target position setting processing of FIG. 3. The dotted line indicates a parkable area PA, and the thick white line along the dotted line indicates a parking frame 94. The parking setting unit 66 sets a matching position of an own vehicle position CP of a vehicle 90 to be parked as the parking target position TP. The own vehicle position CP of the vehicle 90 is the center position of the vehicle 90, but may be any other position. For example, the own vehicle position CP of the vehicle 90 may be a position on the center of the transverse direction of the vehicle 90 such as the center of the transverse direction of the rear wheel axle of the vehicle 90. In the following plan views, the left, right, front and rear of the vehicle 90 will be described as the transverse direction and the longitudinal direction.

For example, as illustrated in FIG. 4, when an occupant 92 rides only on the right side of the vehicle 90, that is, when the occupant position is only the right side, the parking setting unit 66 sets the parking target position TP such that the left side of the vehicle 90 is located close to the left boundary of the parkable area PA. In other words, the parking setting unit 66 sets the parking target position TP such that the own vehicle position CP of the vehicle 90 is located closer to the boundary of the parkable area PA on the left side, which is the opposite side to the occupant position of the vehicle 90, from the center AC of the parkable area PA.

Returning back to FIG. 3, when it is determined that a plurality of occupants are separated and ride on the left and right sides of the vehicle and the occupant position is not one side (S162: No), the parking setting unit 66 determines whether or not there is a difference between the physiques of the plurality of occupants (S166). Specifically, the parking setting unit 66 acquires information on the physiques of the occupants associated with the occupant positions from the occupant information 76 in the storage unit 52. The information on the physiques of the occupants may be information on the weights of the occupants, may be information on the widths of the bodies of the occupants, or may be both pieces of information. The parking setting unit 66 calculates the sum of the physiques of the occupants on the right side of the vehicle (hereinafter, "right sum") and the sum of the physiques of the occupants on the left side of the vehicle (hereinafter, "left sum") based on the information on the physiques of the occupants. Next, the parking setting unit 66 calculates the absolute value of the difference between the right sum and the left sum (hereinafter, "physique difference"). The parking setting unit 66 determines the presence or absence of the physique difference by comparing the physique difference with a predetermined physique threshold value. For example, the physique threshold value may be set to 10% of the sum of the physiques of all of the occupants. The parking setting unit 66 determines that there is the physique difference when the corresponding physique difference is equal to or greater than the predetermined physique threshold value, but determines that there is no physique difference when the physique difference is less than the physique threshold value. In addition, the physique threshold value may be 0. In this case, when there is a physique difference even a little, the parking setting unit 66 may determine that a physique difference is present.

When it is determined that there is a physique difference (S166: Yes), the parking setting unit 66 sets the parking target position in the parkable area based on the physiques of the occupants, and stores the parking target position information 80 in the storage unit 52 (S168). Specifically, the parking setting unit 66 sets the parking target position in the parkable area such that, of the left and right sides of the vehicle, one side at which the sum of the physiques is larger is located away from the boundary of the parkable area and the other side at which the sum of the physiques is smaller is located close to the boundary of the parkable area. In other words, the parking setting unit 66 sets the parking target position in the parkable area such that the own vehicle position of the vehicle in the transverse direction (e.g., the center of the vehicle in the transverse direction) is located closer to the boundary of the parkable area on the side, at which the sum of the physiques of the occupants is smaller, from the center of the parkable area.

Figure 5:
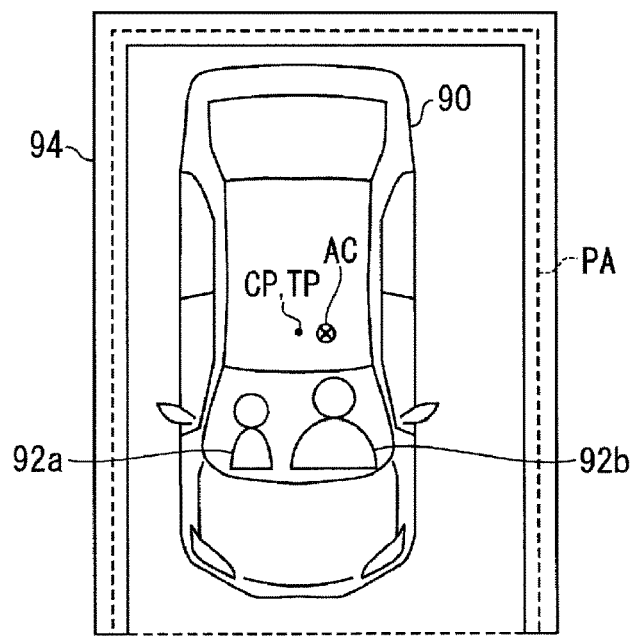
FIG. 5 is a plan view illustrating an example of a parking target position set by the parking target position setting processing of FIG. 3.

FIG. 5 is a plan view illustrating an example of the parking target position TP set by the parking target position setting processing of FIG. 3.

For example, as illustrated in FIG. 5, when occupants 92a and 92b ride on the left and right sides of the vehicle 90 and the physique of the left occupant 92b is larger than that of the right occupant 92a, the parking setting unit 66 sets the parking target position TP such that the right side of the vehicle 90 is located close to the right boundary of the parkable area PA indicated by the dotted line. In other words, the parking setting unit 66 sets the parking target position TP such that the own vehicle position CP of the vehicle 90 is located closer to the right boundary of the parkable area PA, which is the opposite side to the occupant 92b having a larger physique, from the center AC of the parkable area PA.

Returning back to FIG. 3, when it is determined that there is no physique difference (S166: No), the parking setting unit 66 sets the parking target position such that the own vehicle position of the vehicle is the center of the parkable area in the transverse direction, and stores the parking target position information 80 in the storage unit 52 (S170).

When setting the parking target position in any one of steps S164, S168, and S170, the parking setting unit 66 ends the parking target position setting processing, and outputs a route setting instruction to the route setting unit 68.

Returning to FIG. 2, when acquiring the route setting instruction, the route setting unit 68 sets an ideal route, which is an ideal route from the current own vehicle position to the parking target position, by a known method, and stores the ideal route in the storage unit 52 (S118). For example, the route setting unit 68 calculates or acquires the current own vehicle position relative to the parking target position indicated by the parking target position information 80 stored in the storage unit 52. The route setting unit 68 may set the ideal route from the current own vehicle position, which has no interference from an object indicated by the peripheral information 78, to the parking target position by a known method. When setting the ideal route, the route setting unit 68 stores the ideal route information 82 in the storage unit 52, and outputs an output control instruction to the output control unit 70.

When acquiring the output control instruction, the output control unit 70 assists parking of the vehicle to the parking target position based on the ideal route (S120). Specifically, the output control unit 70 may cause the display unit 30 to display the ideal route, and may instruct an operation of an accelerator, a brake, a shift, a steering wheel, or the like by audio. In addition, the output control unit 70 may control the accelerator, the brake, the shift, the steering wheel, or the like via the accelerator control unit 46, the brake control unit 44, the shift control unit 42, and the steering control unit 48, and may automatically drive the vehicle to the parking target position. Here, when the own vehicle position deviates from the ideal route, the output control unit 70 may cause the parking setting unit 66 to reset the parking target position, and may cause the route setting unit 68 to reset the ideal route based on the parking target position. In addition, when the own vehicle position deviates from the ideal route, the output control unit 70 may cause the route setting unit 68 to reset only the ideal route using the completely set parking target position.

As described above, in the parking assistance apparatus 12 of the first embodiment, since the parking setting unit 66 sets the parking target position based on the occupant information 76 including information of the occupant, it is possible to set the parking target position to an appropriate position at which the occupant may easily get on/off.

For example, based on the occupant information 76 including the occupant position, when the occupant rides on only one side of the vehicle, the parking assistance apparatus 12 sets the parking target position such that the side on which the occupant rides is located away from the boundary of the parkable area. Thus, the parking assistance apparatus 12 may set the parking target position at a position at which the space on the occupant side increases so that the occupant may more easily get on/off.

In addition, when occupants ride on both sides of the vehicle, the parking assistance apparatus 12 sets the parking target position such that the side of the occupant having a larger physique (or a side at which the sum of the physiques is larger) is located away from the boundary of the parkable area based on the occupant information 76 including information on the physique of the occupant. Thus, the parking assistance apparatus 12 may set the parking target position at a position at which the space on the side of the occupant having a larger physique increases such that the occupant with a larger physique may easily get on/off.

<Second Embodiment>

Next, a second embodiment will be described, in which a part of the parking target position setting processing (S116) of the first embodiment is changed. In the second embodiment, the vehicle information 74 stored in the storage unit 52 includes door information of the vehicle. The door information of the vehicle includes information on the opening/closing of a door. For example, the door information includes information for determining the type of a door such as a door that rotates around a vertical axis (hereinafter, "rotating door") or a sliding door that slides in a horizontal direction. The door information may include information on an area necessary for the opening/closing of a door (hereinafter, "opening/closing area"). The parking setting unit 66 of the second embodiment sets the parking target position in the parkable area based on the door information of the vehicle information 74.

In the parking assistance processing according to the second embodiment, the initial determination unit 60 executes the initial setting by acquiring the vehicle information 74 including the door information of the vehicle in step S106.

Figure 6:
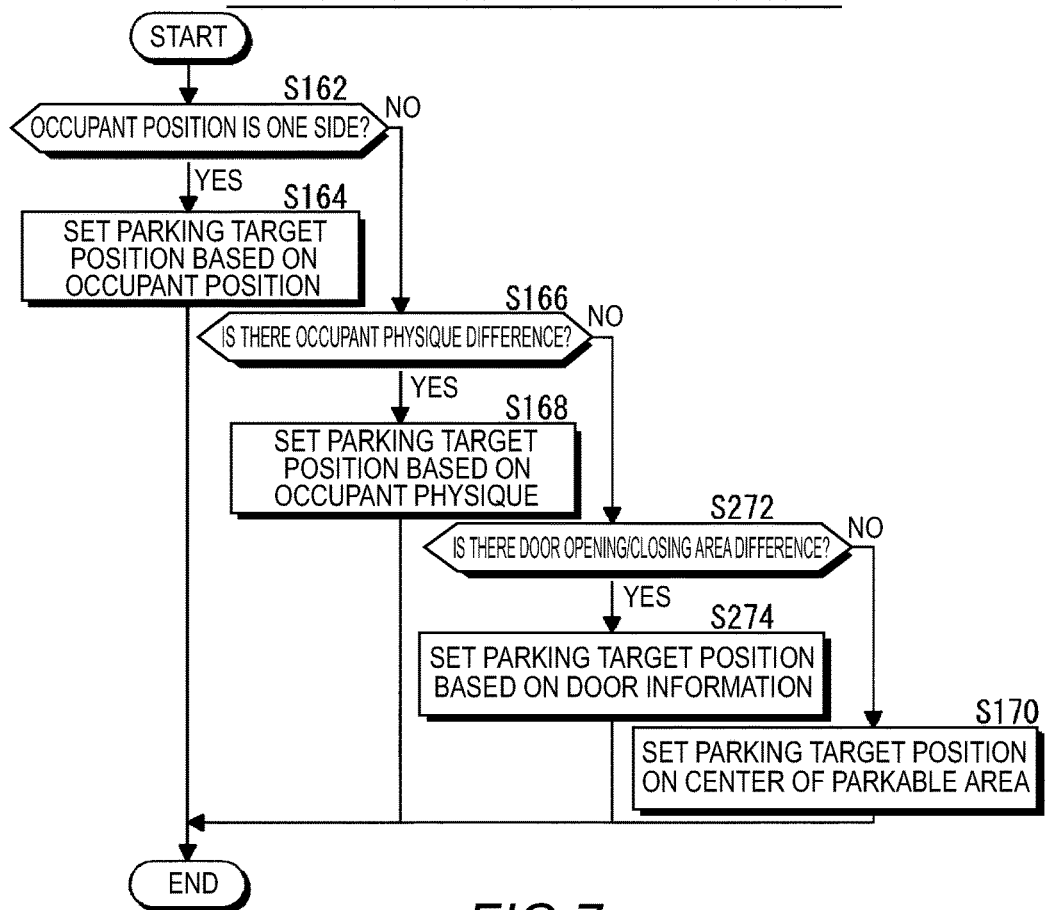
FIG. 6 is a flowchart of a parking target position setting processing of a parking assistance processing executed by a parking assistance apparatus according to a second embodiment.

FIG. 6 is a flowchart of the parking target position setting processing (S116) of the parking assistance processing executed by the parking assistance apparatus 12 according to the second embodiment. The same step numerals will be given to the same steps as the steps of the flowcharts of FIGS. 2 and 3, and a description thereof will be omitted.

As illustrated in FIG. 6, when the parking setting unit 66 of the second embodiment determines that there is no physique difference of the occupants (S166: No), the parking setting unit 66 of the second embodiment determines whether or not there is a difference in the opening/closing area of the doors of the vehicle (hereinafter, "opening/closing area difference") based on the door information included in the vehicle information 74 acquired from the storage unit 52 (S272). For example, in a case where one side of the vehicle is provided with a rotating door and the other side is provided with a sliding door, the parking setting unit 66 may determine that there is the opening/closing area difference based on the types of the doors included in the door information without calculating specific opening/closing areas. In addition, the parking setting unit 66 may determine the presence or absence of the opening/closing area difference by calculating the areas necessary for the opening/closing of the doors based on the door information.

When it is determined that there is the opening/closing area difference of the doors (S272: Yes), the parking setting unit 66 sets the parking target position in the parkable area based on the door information, and stores the parking target position in the storage unit 52 (S274). Specifically, based on the types of the doors or the opening/closing areas indicated by the information on the doors, the parking setting unit 66 sets the parking target position in the parkable area such that, of the left and right sides of the vehicle, one side at which the opening/closing area of the door such as the rotating door is larger is located away from the boundary of the parkable area and the other side at which the opening/closing area of the door such as the sliding door is smaller is located close to the boundary of the parkable area. In other words, the parking setting unit 66 sets the parking target position in the parkable area such that the own vehicle position of the vehicle in the transverse direction (e.g., the center of the vehicle in the transverse direction) is located closer to the boundary of the parkable area on the side, at which the opening/closing area of the door is smaller, from the center of the parkable area.

Figure 7:
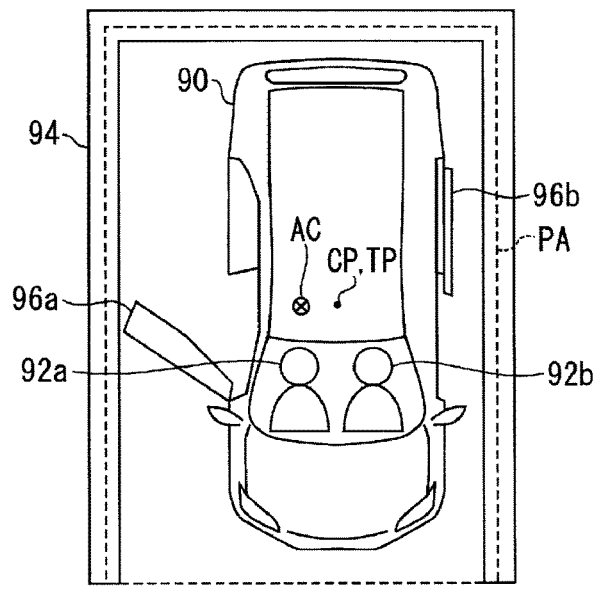
FIG. 7 is a plan view illustrating an example of a parking target position set by the parking target position setting processing of FIG. 6.

FIG. 7 is a plan view illustrating an example of the parking target position TP set by the parking target position setting processing of FIG. 6.

In an example illustrated in FIG. 7, the right side of the vehicle 90 is provided with a rotating door 96a having a large opening/closing area, and the left side is provided with a sliding door 96b having a small opening/closing area. As such, when the opening/closing area difference between the doors 96a and 96b is large, the parking setting unit 66 sets the parking target position TP such that the right side of the vehicle 90, which is the side of the rotating door 96a having a larger opening/closing area than the sliding door 96b, is located away from the right boundary of the parkable area PA indicated by the dotted line and such that the left side of the vehicle 90 is located close to the left boundary of the parkable area PA. In other words, the parking setting unit 66 sets the parking target position TP such that the own vehicle position CP of the vehicle 90 is located closer to the left boundary of the parkable area PA, which is the side of the sliding door 96b having a small opening/closing area, from the center AC of the parkable area PA.

Returning to FIG. 6, when it is determined that there is no difference in the opening/closing area of the doors (S272: No), the parking setting unit 66 sets the parking target position so that the own vehicle position of the vehicle is the center of the parkable area (S170).

As described above, in the parking assistance apparatus 12 of the second embodiment, the parking setting unit 66 sets the parking target position based on the door information included in the vehicle information 74. Thus, the parking assistance apparatus 12 may set the parking target position such that the side of the door having a large opening/closing area is located away from the boundary of the parkable area. As a result, the parking assistance apparatus 12 may set the parking target position at a position at which the occupant may easily open/close the door having a large opening/closing area, and may easily get on/off.

<Third Embodiment>

Next, a third embodiment will be described, in which a part of the parking target position setting processing (S116) of the first embodiment is changed. In the third embodiment, the vehicle information 74 stored in the storage unit 52 includes door information of the vehicle. The door information of the vehicle includes information on the opening/closing of a door. For example, the door information includes information on the trajectory of a door during the opening/closing of the door. The parking setting unit 66 of the third embodiment detects an object, which interferes with the opening/closing of the door, from the peripheral information 78 and the door information of the vehicle information 74, and sets a parking direction of the vehicle based on the object. For example, when a door is openable/closeable after parking in only one of a forward direction and a reverse direction, the parking setting unit 66 sets the direction in which the corresponding door is openable/closeable as the parking direction.

In the parking assistance processing according to the third embodiment, the initial determination unit 60 executes the initial setting by acquiring the vehicle information 74 including the door information of the vehicle in step S106.

Figure 8:
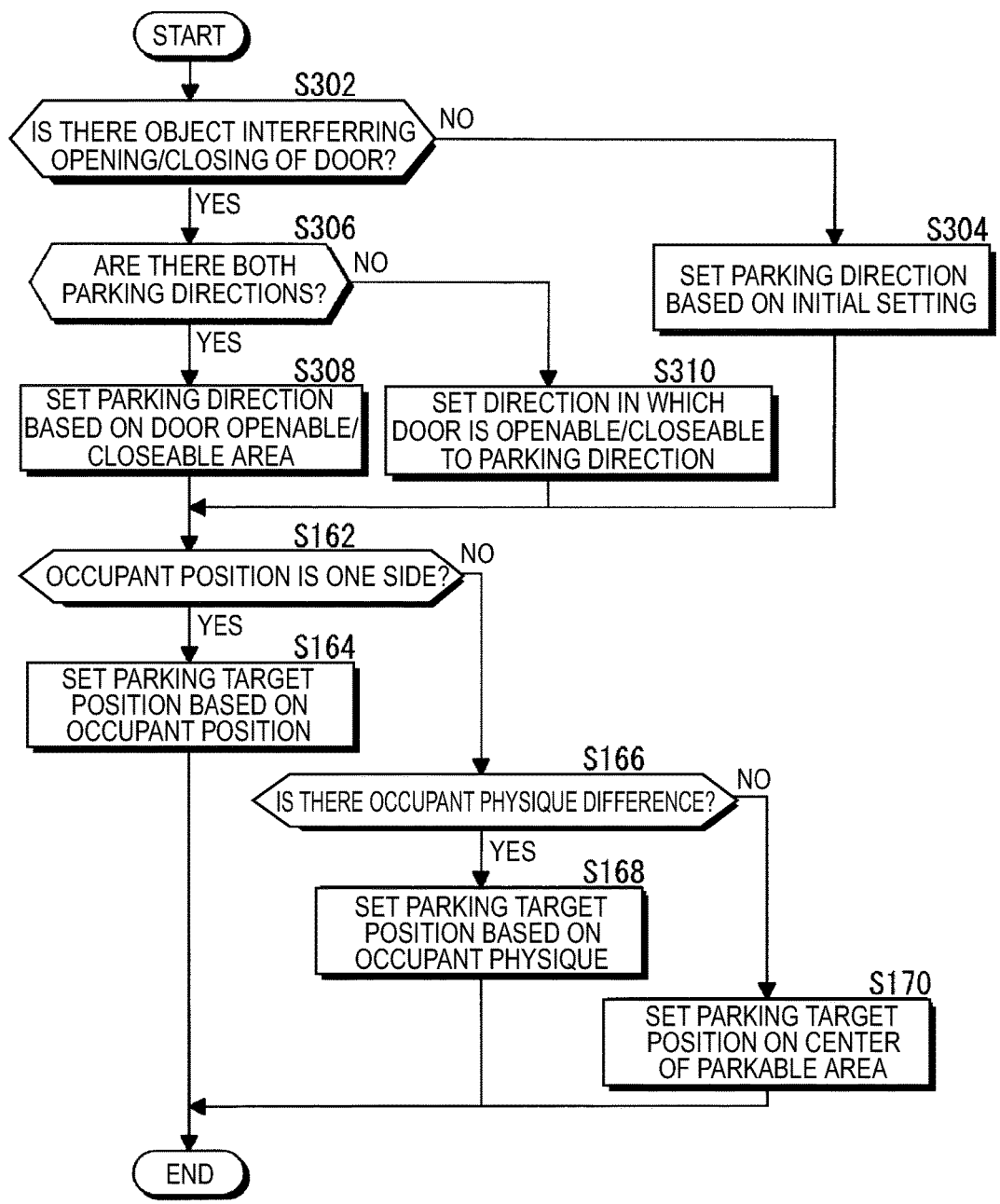
FIG. 8 is a flowchart of a parking target position setting processing of a parking assistance processing executed by a parking assistance apparatus according to a third embodiment.

FIG. 8 is a flowchart of the parking target position setting processing (S116) of the parking assistance processing executed by the parking assistance apparatus 12 according to the third embodiment. The same step numerals will be given to the same steps as the steps in the flowcharts of FIGS. 2, 3 and 6, and a description thereof will be omitted.

As illustrated in FIG. 8, the parking setting unit 66 of the third embodiment determines whether or not there is an object, which interferes with the opening/closing of a door, in the periphery based on the peripheral information 78 and the door information of the vehicle information 74 (S302). For example, the parking setting unit 66 determines whether or not there is an object, which interferes with the opening/closing of a door, in the periphery by detecting the presence or absence of a peripheral object, which is brought into contact with the door that is being opened/closed, based on the peripheral information 78 and the door information including the trajectory information of the door. When it is determined that there is no obstacle, which interferes with the opening/closing of a door (S302: No), the parking setting unit 66 sets, for example, a reverse direction as the parking direction based on the initial setting (S304). The corresponding initial setting may be set in advance by an occupant input or the like.

When it is determined that there is an object, which interferes with the opening/closing of a door (S302: Yes), the parking setting unit 66 determines whether or not the parking the vehicle is possible in both a forward direction and a reverse direction (S306). Specifically, when the door may be opened/closed to such an extent that the occupant may get on/off due to an object, which interferes with the opening/closing of the door, in both the forward and reverse directions, the parking setting unit 66 determines that parking is possible in both parking directions. On the other hand, when there is a direction in which the door may not be opened/closed to such an extent that the occupant may get on/off due to an object, which interferes with the opening/closing of the door, the parking setting unit 66 determines that parking is possible in one parking direction. In addition, the opening/closing of the door may be determined in a state where the vehicle is parked such that the center of the vehicle is aligned with the center of the parkable area in the transverse direction.

When it is determined that parking is possible in both directions (S306: Yes), the parking setting unit 66 sets the parking direction based on a door openable/closable area (S308). The door openable/closable area is an area in which the door may be opened/closed without interference from a peripheral object. Specifically, the parking setting unit 66 sets the direction in which the door openable/closable area is large as the parking direction.

Figure 9:
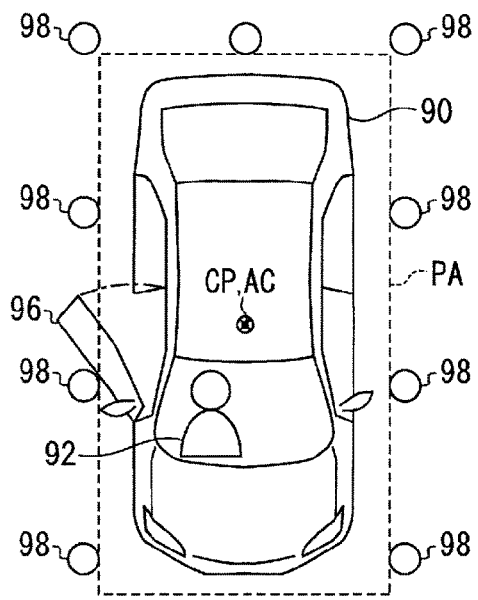
FIG. 9 is a plan view for explaining a method of setting a parking direction by the parking target position setting processing of FIG. 8.
Figure 10:
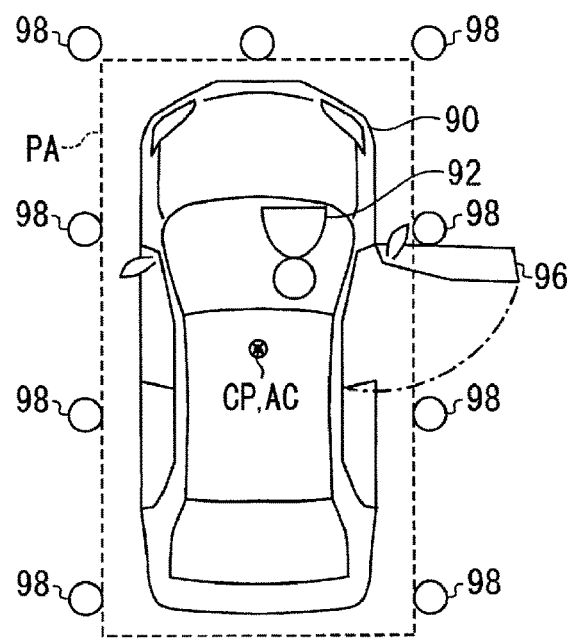
FIG. 10 is a plan view for explaining the method of setting the parking direction by the parking target position setting processing of FIG. 8.

FIGS. 9 and 10 are plan views for explaining a method of setting the parking direction by the parking target position setting processing of FIG. 8. In FIGS. 9 and 10, the parking setting unit 66 sets the parkable area PA inside a plurality of poles 98 erected therearound. The plurality of poles 98 is an example of an object that interferes with the opening/closing of a door 96. As illustrated in FIGS. 9 and 10, the parking setting unit 66 may determine whether or not the door 96 is openable/closeable in a parked state where the own vehicle position CP of the vehicle 90 is aligned with the center AC of the parkable area PA.

As illustrated in FIG. 9, when the vehicle 90 is parked in the parkable area in a reverse direction, the door openable/closable area for the door 96, which is opened/closed by the occupant 92, is small because it is interfered with the poles 98. On the other hand, as illustrated in FIG. 10, when the vehicle 90 is parked in the parkable area PA in a forward direction, the door openable/closable area for the door 96, which is opened/closed by the occupant 92, is large because it is not interfered with the poles 98. Therefore, in this case, the parking setting unit 66 sets the forward direction in which the door openable/closable area for the door 96 is large as the parking direction.

Returning to FIG. 8, when it is determined that the door may be opened/closed to such an extent that the occupant may get on/off after parking in only one of the forward and reverse parking directions and that the door may not be opened/closed due to the interference of poles or the like in the other direction (S306: No), the parking setting unit 66 sets the direction in which the door is openable/closable as the parking direction (S310).

Thereafter, the parking setting unit 66 sets the parking target position by executing the processings after step S308 based on the set parking direction.

As described above, in the parking assistance apparatus 12 of the third embodiment, the parking setting unit 66 sets the parking direction by detecting an object such as a pole or the like, which interferes with the opening/closing of the door, based on the peripheral information 78 and the door information of the vehicle information 74. For example, when the opening/closing of the door is possible in only one of the forward direction and the reverse direction, the parking setting unit 66 sets the direction in which the door is openable/closable as the parking direction. Thus, the parking assistance apparatus 12 may set the parking direction such that the occupant may avoid a situation in which the door is not openable/closable due to an object and is capable of reliably getting on/off.

In addition, when the opening/closing of the door are possible in both the forward direction and the reverse direction, the parking setting unit 66 sets the direction in which the door openable/closable area may increase as the parking direction. Thus, the parking assistance apparatus 12 may set the parking direction so that the occupant may open/close the door largely so as to easily get on/off.

<Fourth Embodiment>

Next, a fourth embodiment will be described, in which a part of the parking target position setting processing (S 116) of the first embodiment is changed. The parking setting unit 66 of the fourth embodiment detects an object, which interferes with the getting on/off of the occupant from the peripheral information 78, and sets the parking direction of the vehicle based on the corresponding object.

Figure 11:
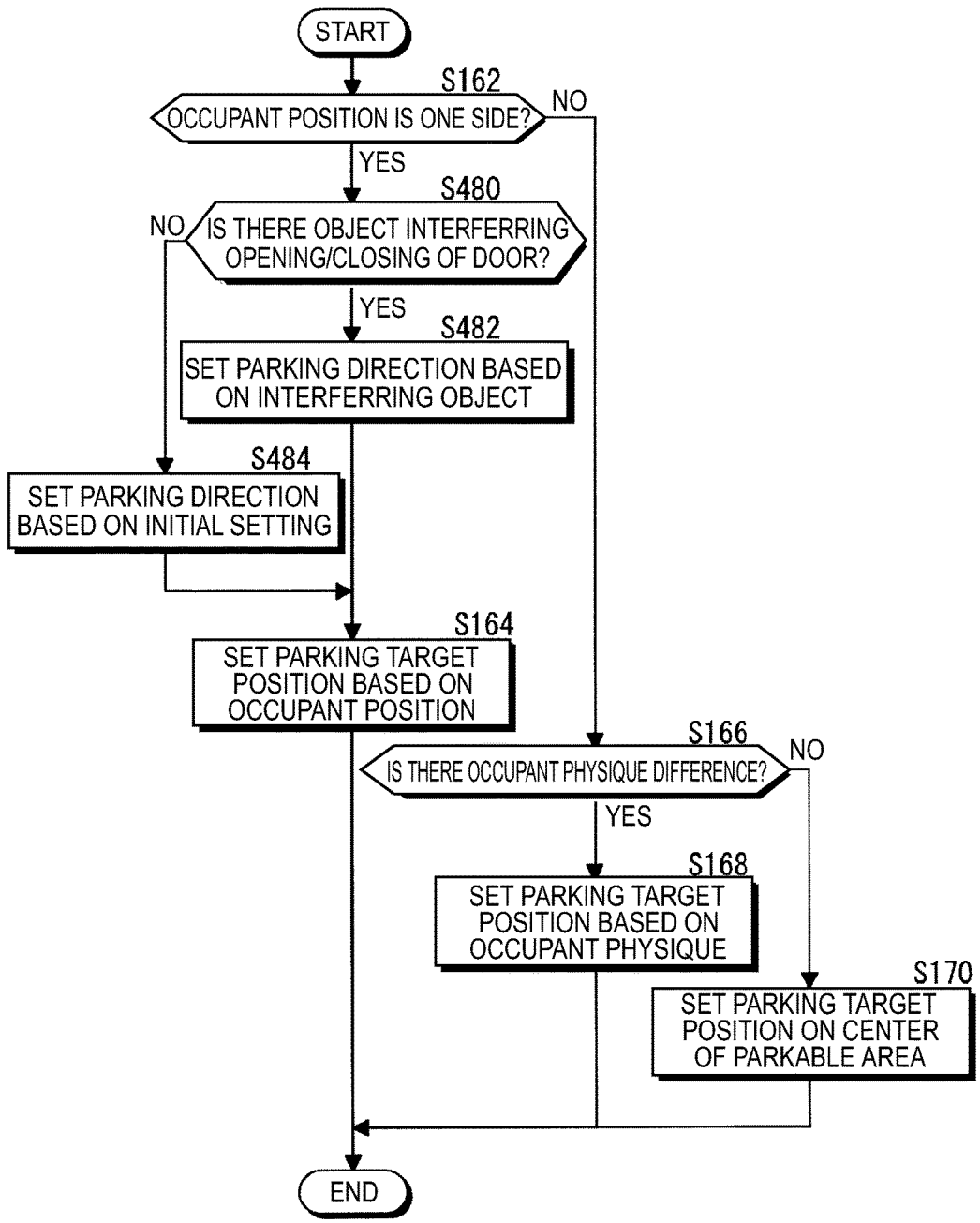
FIG. 11 is a flowchart of a parking target position setting processing of a parking assistance processing executed by a parking assistance apparatus according to a fourth embodiment.

FIG. 11 is a flowchart of the parking target position setting processing (S116) of the parking assistance processing executed by the parking assistance apparatus 12 according to the fourth embodiment. The same step numerals will be given to the same steps as the steps of the flowcharts of FIGS. 2, 3 6 and 8, and a description thereof will be omitted.

When it is determined that the occupant position is one side of the vehicle based on the occupant information 76 (S162: Yes), the parking setting unit 66 of the fourth embodiment determines whether or not there is an object such as an obstacle, which interferes with the getting on/off of the occupant based on the peripheral information 78 (S480). For example, when an obstacle such as a groove or a protrusion is present in or around the parkable area, the parking setting unit 66 determines that there is an object, which interferes with the getting on/off of the occupant. On the other hand, when the inside or the periphery of the parkable area is substantially flat, the parking setting unit 66 determines that there is no object, which interferes with the getting on/off of the occupant.

When it is determined that there is an object, which interferes with the getting on/off (S480: Yes), the parking setting unit 66 sets the parking direction of the vehicle based on the interfering object (S482). For example, the parking setting unit 66 sets the parking direction of the vehicle so that the side of the occupant position is the opposite side to the interfering object.

Figure 12:
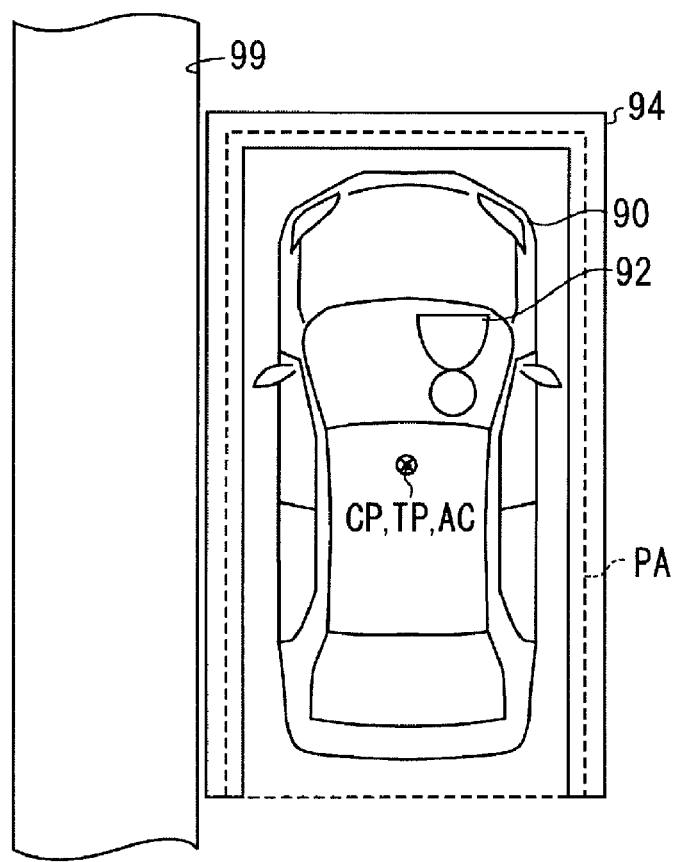
FIG. 12 is a plan view for explaining a method of setting a parking direction by the parking target position setting processing of FIG. 11.

FIG. 12 is a plan view for explaining a method of setting the parking direction by the parking target position setting processing of FIG. 11. A groove 99, which is an example of an object, which interferes with the getting on/off of the occupant 92, is present on the left side of the vehicle 90 illustrated in FIG. 12. In this case, when the vehicle 90 is parked in a reverse direction, the groove 99 is on the side of the occupant position. On the other hand, when the vehicle 90 is parked in a forward direction as illustrated in FIG. 12, the groove 99 is on the opposite side to the occupant position. Therefore, the parking setting unit 66 sets the parking direction of the vehicle 90 as a forward direction so that the side of the occupant position (i.e., the right side) is the opposite side to the groove 99.

Returning to FIG. 11, when it is determined that there is no object, which interferes with the getting on/off (S480: No), the parking setting unit 66 sets, for example, a reverse direction as the parking direction based on the initial setting or an instruction from the occupant (S484). In addition, the parking setting unit 66 may set the parking direction based on the door openable/closable area as in step S308.

Thereafter, the parking setting unit 66 sets the parking target position based on step S164.

As described above, in the parking assistance apparatus 12 of the fourth embodiment, the parking setting unit 66 detects an object, which interferes with the getting on/off of the occupant such as a groove, from the peripheral information 78, and sets the parking direction such that the occupant is located away from the corresponding object. Thus, the parking assistance apparatus 12 may prevent the getting on/off of the occupant from being interfered from the corresponding object, and may set the position at which the occupant may easily get on/off as the parking target position.

The function, connection relationship, number, arrangement, and the like of the configurations of respective embodiments described above may be appropriately changed, deleted, and so on within the scope of the disclosure and the scope equivalent to the scope of the disclosure. Respective embodiments may be appropriately combined with each other. The order of respective steps of each embodiment may be appropriately changed.

In the embodiments described above, the occupant information acquisition unit 24 includes the in-vehicle imaging unit 34 and the weight detection unit 36, but the disclosure is not limited thereto. For example, the occupant information acquisition unit 24 may have a radar, a sonar, or the like, which detects a situation inside the vehicle.

In the embodiments described above, the parking target position is set based on a size relationship of the sum of the physiques of the occupants in step S168, but the parking target position may be set based on a size relationship of the physiques of individual occupants. For example, the parking target position may be set such that the side of the occupant having the largest physique is located away from the boundary of the parkable area. In this case, the parking setting unit 66 may omit determination of the physique difference.

Steps S108 to S112 in the embodiments described above may be changed in order, and may be processed simultaneously (that is, parallel processing). Steps S302 to S310 in the third embodiment described above may be executed between step S162 and step S164.

A parking assistance apparatus according to an aspect of this disclosure includes an occupant information processing unit configured to process information on an occupant of a vehicle to generate occupant information, a peripheral information processing unit configured to process information on a periphery of the vehicle to generate peripheral information including information on an object in the periphery of the vehicle, and a parking setting unit configured to detect a parkable area which is an area in which the vehicle is parkable based on the peripheral information, and set a parking target position that is a target of parking of the vehicle in the parkable area based on the occupant information.

With this configuration, the parking assistance apparatus according to the aspect of this disclosure may set the parking target position to an appropriate position at which the occupant may easily get on/off since the parking target position is set based on the occupant information.

In the parking assistance apparatus according to the aspect of this disclosure, the occupant information processing unit may generate the occupant information including information on a position of the occupant in the vehicle, which is detected by processing the information on the occupant of the vehicle, and the parking setting unit may set the parking target position in the parkable area based on the position of the occupant.

With this configuration, the parking assistance apparatus according to the aspect of this disclosure may set the parking target position to an appropriate position, at which the occupant may more easily get on/off, based on the position of the occupant.

In the parking assistance apparatus according to the aspect of this disclosure, the parking setting unit may set a parking position of the vehicle to a position at which a center of the parkable area deviates from a center of the vehicle.

In the parking assistance apparatus according to the aspect of this disclosure, the parking setting unit may set the parking target position at a position at which the vehicle is located close to a boundary of the parkable area which is an opposite side to the position of the occupant about a center of a transverse direction of the vehicle.

In the parking assistance apparatus according to the aspect of this disclosure, when there are a plurality of occupants, the occupant information processing unit may generate the occupant information including information on physiques of the plurality of occupants, which is detected by processing the information on the occupant of the vehicle, and the parking setting unit may set the parking target position in the parkable area based on the physiques of the plurality of occupants.

With this configuration, the parking assistance apparatus according to the aspect of this disclosure may set the parking target position to an appropriate position, at which each occupant may more easily get on/off, based on the physiques of the plurality of occupants.

In the parking assistance apparatus according to the aspect of this disclosure, the parking setting unit may calculate a left sum that is a sum of the physiques of the occupants whose occupant position is a left side, among the plurality of occupants, calculate a right sum that is a sum of the physiques of the occupants whose occupant position is a right side, among the plurality of occupants, and set the parking target position such that a side of the vehicle corresponding to a larger one of the left sum and the right sum is located far away from the boundary of the parkable area and a side corresponding to a smaller one of the left sum and the right sum is located close to the boundary of the parkable area.

The parking assistance apparatus according to the aspect of this disclosure may further include a storage unit configured to store door information including information on opening/closing of a door of the vehicle, and the parking setting unit may set the parking target position in the parkable area based on the door information.

With this configuration, the parking assistance apparatus according to the aspect of this disclosure may set the parking target position to a position, at which the occupant may easily open/close the door and the occupant may easily get on/off, based on the door information.

In the parking assistance apparatus according to the aspect of this disclosure, the door information may include information on an opening/closing area of the door which is an area necessary for the opening/closing of the door, and the parking setting unit may set the parking target position in the parkable area such that, of left and right sides of the vehicle, one side having a larger opening/closing area of the door is located far away from the boundary of the parkable area and a remaining side having a smaller opening/closing area of the door is located close to the boundary of the parkable area.

The parking assistance apparatus according to the aspect of this disclosure may further include a storage unit configured to store door information including information on opening/closing of a door of the vehicle, in which the parking setting unit may detect an object, which interferes with the opening/closing of the door, from the peripheral information and the door information, and may set a parking direction of the vehicle based on the corresponding object.

With this configuration, the parking assistance apparatus according to the aspect of this disclosure may set the parking direction such that the opening/closing of the door by the occupant is not interfered with the object detected based on the peripheral information and the door information.

In the parking assistance apparatus according to the aspect of this disclosure, the parking setting unit may set a direction in which the door is openable/closeable as the parking direction.

With this configuration, the parking assistance apparatus according to the aspect of this disclosure may set the parking direction such that the occupant may reliably open/close the door to get on/off.

The parking assistance apparatus according to the aspect of this disclosure may further include a storage unit configured to store door information including information on opening/closing of a door of the vehicle, in which the parking setting unit may detect an object, which interferes with the opening/closing of the door, from the peripheral information and the door information, and set the parking direction of the vehicle based on an openable/closeable area which is an area in which the door is openable/closeable without interference from the object.

In the parking assistance apparatus according to the aspect of this disclosure, the parking setting unit may set a direction in which the openable/closeable area increases as the parking direction.

In the parking assistance apparatus according to the aspect of this disclosure, the parking setting unit may detect an object that interferes with getting on/off of the occupant from the peripheral information, and may set a parking direction of the vehicle based on the object.

With this configuration, the parking assistance apparatus according to the aspect of this disclosure may set the parking target position to a position at which the occupant may easily get on/off by preventing the object from interfering with getting on/off of the occupant.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance apparatus comprising:
   an occupant information processing unit configured to process information on an occupant of a vehicle to generate occupant information;
   a peripheral information processing unit configured to process information on a periphery of the vehicle to generate peripheral information including information on an object in the periphery of the vehicle; and
   a parking setting unit configured to detect a parkable area which is an area in which the vehicle is parkable based on the peripheral information, and set a parking target position that is a target of parking of the vehicle in the parkable area based on the occupant information, and further comprising:
   a storage unit configured to store door information including information on opening/closing of a door of the vehicle,
   wherein the parking setting unit sets the parking target position in the parkable area based on the door information.

2. The apparatus according to claim 1,
   wherein the occupant information processing unit generates the occupant information including information on a position of the occupant in the vehicle, which is detected by processing the information on the occupant of the vehicle, and
   the parking setting unit sets the parking target position in the parkable area based on the position of the occupant.

3. The apparatus according to claim 2,
   wherein the parking setting unit sets a parking position of the vehicle to a position at which a center of the parkable area deviates from a center of the vehicle.

4. The apparatus according to claim 3,
   wherein the parking setting unit sets the parking target position at a position at which the vehicle is located close to a boundary of the parkable area which is an opposite side to the position of the occupant about a center of a transverse direction of the vehicle.

5. The apparatus according to claim 1,
wherein, when there are a plurality of occupants, the occupant information processing unit generates the occupant information including information on physiques of the plurality of occupants, which is detected by processing the information on the occupant of the vehicle, and
the parking setting unit sets the parking target position in the parkable area based on the physiques of the plurality of occupants.

6. The apparatus according to claim 5,
wherein the parking setting unit calculates a left sum that is a sum of the physiques of the occupants whose occupant position is a left side, among the plurality of occupants, calculates a right sum that is a sum of the physiques of the occupants whose occupant position is a right side, among the plurality of occupants, and sets the parking target position such that a side of the vehicle corresponding to a larger one of the left sum and the right sum is located far away from the boundary of the parkable area and a side corresponding to a smaller one of the left sum and the right sum is located close to the boundary of the parkable area.

7. The apparatus according to claim 1,
wherein the door information includes information on an opening/closing area of the door which is an area necessary for the opening/closing of the door, and
the parking setting unit sets the parking target position in the parkable area such that, of left and right sides of the vehicle, one side having a larger opening/closing area of the door is located far away from the boundary of the parkable area and a remaining side having a smaller opening/closing area of the door is located close to the boundary of the parkable area.

8. The apparatus according to claim 1,
wherein the parking setting unit detects the object, which interferes with the opening/closing of the door, from the peripheral information and the door information, and sets a parking direction of the vehicle based on the object.

9. The apparatus according to claim 8,
wherein the parking setting unit sets a direction in which the door is openable/closeable as the parking direction.

10. The apparatus according to claim 1,
wherein the parking setting unit detects the object, which interferes with the opening/closing of the door, from the peripheral information and the door information, and sets a parking direction of the vehicle based on an openable/closeable area which is an area in which the door is openable/closeable without interference from the object.

11. The apparatus according to claim 10,
wherein the parking setting unit sets a direction in which the openable/closeable area increases as the parking direction.

12. The apparatus according to claim 1,
wherein the parking setting unit detects an object that interferes with getting on/off of the occupant from the peripheral information, and sets a parking direction of the vehicle based on the object.

13. A parking assistance apparatus comprising:
an occupant information processing unit configured to process information on an occupant of a vehicle to generate occupant information;
a peripheral information processing unit configured to process information on a periphery of the vehicle to generate peripheral information including information on an object in the periphery of the vehicle; and
a parking setting unit configured to detect a parkable area which is an area in which the vehicle is parkable based on the peripheral information, and set a parking target position that is a target of parking of the vehicle in the parkable area based on the occupant information, and further comprising:
a storage unit configured to store door information including information on opening/closing of a door of the vehicle,
wherein the parking setting unit detects the object, which interferes with the opening/closing of the door, from the peripheral information and the door information, and sets a parking direction of the vehicle based on the object.

14. A parking assistance apparatus comprising:
an occupant information processing unit configured to process information on an occupant of a vehicle to generate occupant information;
a peripheral information processing unit configured to process information on a periphery of the vehicle to generate peripheral information including information on an object in the periphery of the vehicle; and
a parking setting unit configured to detect a parkable area which is an area in which the vehicle is parkable based on the peripheral information, and set a parking target position that is a target of parking of the vehicle in the parkable area based on the occupant information, and further comprising:
a storage unit configured to store door information including information on opening/closing of a door of the vehicle,
wherein the parking setting unit detects the object, which interferes with the opening/closing of the door, from the peripheral information and the door information, and sets a parking direction of the vehicle based on an openable/closeable area which is an area in which the door is openable/closeable without interference from the object.

* * * * *